United States Patent
Greene et al.

(10) Patent No.: US 10,929,467 B2
(45) Date of Patent: Feb. 23, 2021

(54) METHOD FOR CUSTOM-TAGGING AND RECOGNIZING RECYCLED DATA

(71) Applicants: Colby Greene, Raleigh, NC (US); Vamshi Guduguntla, Raleigh, NC (US); Andrew Schrader, Raleigh, NC (US)

(72) Inventors: Colby Greene, Raleigh, NC (US); Vamshi Guduguntla, Raleigh, NC (US); Andrew Schrader, Raleigh, NC (US)

( * ) Notice: Subject to any disclaimer, the term of this patent is extended or adjusted under 35 U.S.C. 154(b) by 211 days.

(21) Appl. No.: 16/215,802

(22) Filed: Dec. 11, 2018

(65) Prior Publication Data
US 2020/0183978 A1    Jun. 11, 2020

(51) Int. Cl.
*G06F 16/901* (2019.01)
*G06F 16/11* (2019.01)

(52) U.S. Cl.
CPC .......... *G06F 16/901* (2019.01); *G06F 16/122* (2019.01)

(58) Field of Classification Search
CPC .. G06F 16/90335; G06F 16/122; G06F 21/62; G06F 21/16; G06F 21/10; G06F 16/901; G06Q 30/0639; G06Q 10/10; G06Q 10/067; H04L 67/104; G16H 50/20; G06K 9/20
See application file for complete search history.

(56) References Cited

U.S. PATENT DOCUMENTS

| | | | | |
|---|---|---|---|---|
| 7,155,487 B2 * | 12/2006 | Yau | ...... | H04L 67/104 709/213 |
| 2001/0047279 A1 * | 11/2001 | Gargone | ...... | G06Q 10/067 705/342 |
| 2004/0205653 A1 * | 10/2004 | Hadfield | ...... | G06Q 10/10 715/255 |
| 2008/0270168 A1 * | 10/2008 | Trzeciak | ...... | G06Q 10/10 705/2 |
| 2009/0288174 A1 * | 11/2009 | Wilson | ...... | G06F 21/16 726/30 |
| 2012/0197596 A1 * | 8/2012 | Comi | ...... | G06F 16/90335 702/188 |
| 2015/0012965 A1 * | 1/2015 | Furukawa | ...... | G06F 16/122 726/1 |
| 2016/0241895 A1 * | 8/2016 | Mohacs | ...... | G06F 21/10 |
| 2017/0132435 A1 * | 5/2017 | Rolin | ...... | G06F 21/62 |
| 2017/0200212 A1 * | 7/2017 | Garrity | ...... | G06Q 30/0639 |
| 2018/0068139 A1 * | 3/2018 | Aalund | ...... | G06K 9/20 |
| 2019/0065683 A9 * | 2/2019 | Korpman | ...... | G16H 50/20 |

* cited by examiner

*Primary Examiner* — Etienne P Leroux
(74) *Attorney, Agent, or Firm* — John L. Sotomayor

(57) ABSTRACT

The present invention is a method for providing camouflaged, customized, synthetic data events and data points masquerading as true data events or data points, and for subsequent detection of such camouflaged data. Synthetic data as used herein is capable of iterative regeneration to provide customized identifiers for distribution to specific purchasers of data. The relationship between a particular data feed with a particular synthetic identifier and the identity of the user to which it was sent would be stored in the original data collector's centralized server for later reference.

7 Claims, 2 Drawing Sheets

METHOD FOR CUSTOM-TAGGING AND RECOGNIZING RECYCLED DATA

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A number of companies that deal in the harvesting, collating, packaging, and selling or re-selling of data must take pains to ensure the freshness and originality of the data so harvested, collated, packaged, sold, or re-sold. Such data freshness and originality are not merely data attributes desired by purchasers; they are indicia for the producing company of quality control and the prevalence of authorized versus unauthorized data use. Occasionally data collected for sale by a first party to a second party is re-collected by third parties for re-sale; occasionally the third parties may re-sell the re-collected data to the originating first party. While such recycling of data need not be conducted nefariously, it is a realistic byproduct of multiple companies engaging in data collection and resale on a large scale.

Some entities have chosen to add synthetic events or data points to saleable data in an effort to readily identify recycled data of dubious freshness and originality. Such synthetic events or data points may take the form of a fictionalized event in a reported series of similar event types (such as a fictionalized automobile accident in a list of verifiable and true automobile accidents occurring in a given place at a given time) or a discrete but fictionalized data element (such as a town name fictionally identified as being located on a map in relation to otherwise verifiable and truly located places).

Some data vendors have determined that adding synthetic events and data points to packaged data, then examining newly attained data for such synthetic events and data points, can help the vendor to determine if the newly acquired data is truly original.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
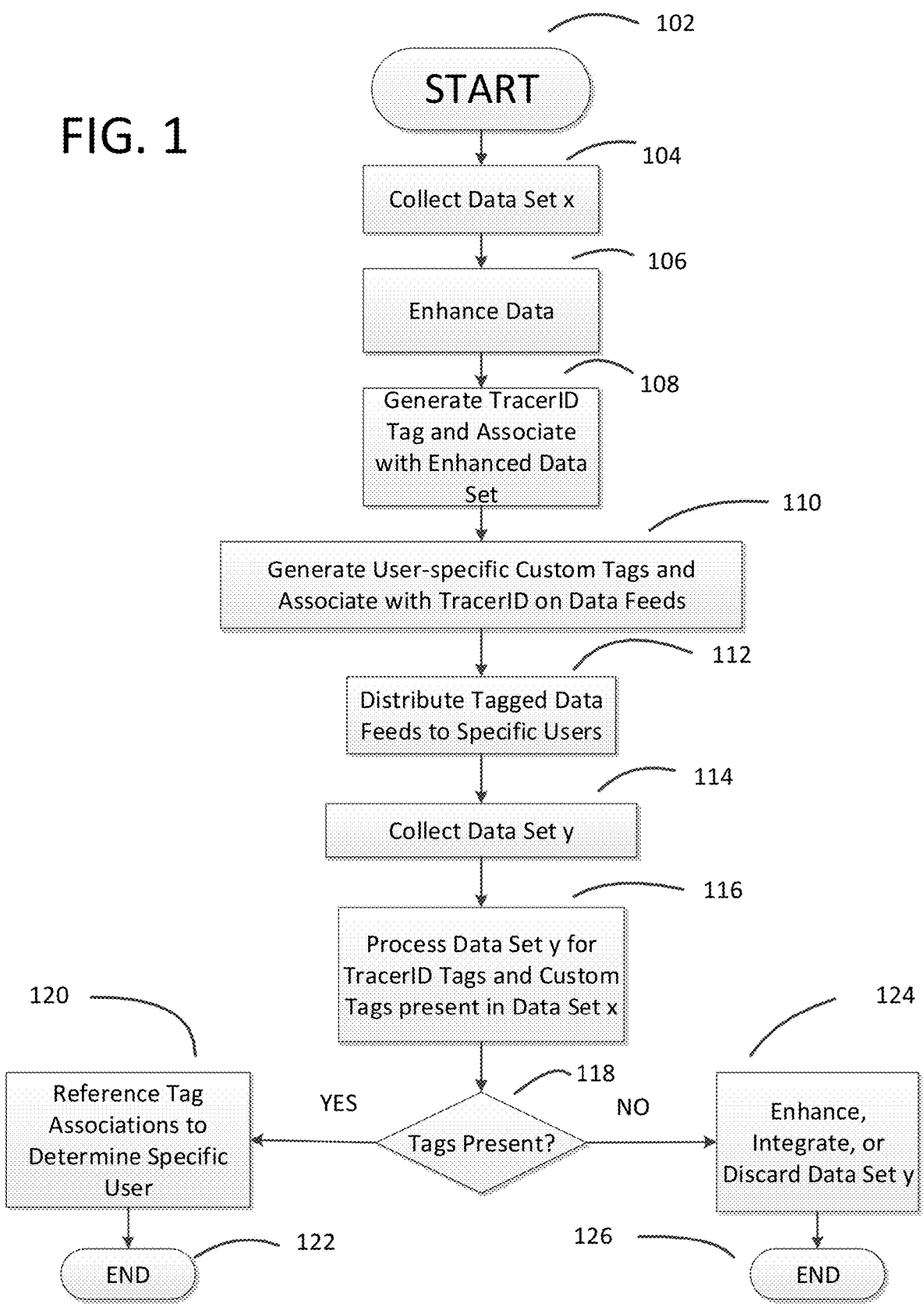
FIG. 1 is a process flow for the collection and processing of data sets consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Developers of mobile applications, web applications, and the like routinely harvest and collect data shared by users of such mobile and web applications. The data collected, such as, in a non-limiting example, user location, timestamp, IP address, as well as other user attributes may then be stored as Event Data, then processed through a series of computer programs to be cleaned, enriched and aggregated. In a non-limiting example, Data Cleaning is done to filter out invalid locations, invalid device identifiers, and inaccurate locations. Similarly, Data Enrichment may be done by appending additional attributes to the existing data, such as the business locations visited by a user device based on location matching, the category of a business location, the type of data-collection signaling event—whether beacon or GPS activated—or the user device time zone, country and state in which a signaling event has taken place. Cleaned and enriched data is of value to purchasers who prize its, provenance, originality, uniqueness, and current state, and as such, collected data can be sold into the marketplace for use by any number of entities in their advertising and marketing efforts.

Once such data is sold, there is no guarantee to the seller that the data will not be recaptured or resold by a third party. Such recaptured or resold data often purports an original provenance, the invalidity of which cannot be readily disproven. Consequently, there is a need to provide camouflaged, customized, synthetic data events and data points masquerading as true data events or data points, in tandem with a method for detection of such camouflaged data. Importantly, such synthetic data, which may be referred to as TracerID, must be capable of iterative regeneration in order to customize identifiers for distribution to specific purchasers. Various iterations of the TracerID may specifically identify any particular data feed transaction, thus associating which data set was sold to which buyer. TracerID regeneration may similarly be employed to defeat efforts by third party data harvesters to permanently remove such data markers.

In an embodiment, an original TracerID information tag would be added to collected, cleaned and enriched data. Very few synthetic location events, known only to the original collector of data, would be introduced by the original collector to the data stored in the data collector's database. A non-limiting example of TracerID event information is given below:

| | |
|---|---|
| Mobile ID | c4e6b9128 |
| Timestamp | 2018-02-02 08:30 00 |
| Lat | 35.23165 |
| Lon | −78.16545 |
| Timezone | EST |
| IP Address | 127.0.0.1 |
| Business Name | Raleigh downtown |
| AppID | 1 |
| Source | GPS |

In an embodiment, each data feed, in a non-limiting example, a cleaned and enriched batch of marketable data, would have a unique TracerID. The particular data feed and TracerID association would be stored in the original data collector's data center, such as, in a non-limiting example, a centralized server, so it can be referenced at a later date.

In an embodiment, each data feed and TracerID association would include a custom element that would identify to which buyer the particular iteration of the data set is sent. By way of non-limiting example, the TracerID that identifies a particular data set would be customized with synthetic data unique to client Customer1 prior to being released to Customer1. A second client's request to purchase the same data set would result in the TracerID being customized with synthetic data unique to client Customer2 prior to being released to Customer2. This process of iterative customization would continue for each discrete client purchase of a particular data set.

Once customized TracerID events are added to customer-specific data feeds, data feeds are then sent to data buyers (e.g.: Customer1, Customer2 . . . Customer(n)). In an embodiment, the original data collector searches newly collected data for these same TracerID events along with indicia of customization.

In an embodiment, new data source prospects may provide the original data collector with data samples for freshness and originality evaluation. During such evaluation, the original data collector may perform a check as to whether the newly proffered sample data contains the any previous TracerID event. This data sample may or may not be fully representative of the data sets that the prospective provider intends to provide the original data collector on an ongoing basis. An example of suspect data from two prospective data sources is shown below:

| | Prospect Number | |
|---|---|---|
| | 1 | 2 |
| Mobile ID | c4e6b9128 | c9b012rv |
| Timestamp | 2018-02-02 08:30 00 | 2018-02-02 06:20 00 |
| Lat | 35.23165 | 35.133165 |
| Lon | −78.16545 | −76.132165 |
| Timezone | EST | EST |
| IP Address | 127.0.0.1 | 16.12.14.15 |
| Business Name | NULL | Bonjangles |
| AppID | NULL | NULL |
| Source | GPS | GPS |
| EventID | 2 | 3 |
| Synthetic Event | Yes | No |
| Flag | Yes | No |

In the above non-limiting example, Prospect 1 is flagged as providing recycled data during the initial data evaluation stage itself. Prospect 2 is a bad actor as well (selling recycled data, whether nefariously or innocently), but is not so identified during the initial evaluation stage. Despite Prospect 2's initial success in passing review, once Prospect 2 begins to provide data daily, TracerID events may be detected by computer programs specifically designed to check for tracer events in the daily-available data stream.

By way of non-limiting example, data associated with Client Number 2 as reflected in the table below is flagged as carrying a synthetic event, which serves as an indicia of the data having been recycled in all or part.

| Client Number | EventID | Synthetic Event | Present in daily data | Flag |
|---|---|---|---|---|
| 2 | 464564132 | Yes | Yes | Yes |
| 3 | 649843213 | No | No | No |
| 4 | 465489489 | No | No | No |

Reviewing the stored association of TracerID and data set to which it was appended, along with the associated customized data recipient tag, permits a determination regarding which data set was included in which data feed, and which data feed was sent to which customer. In an embodiment, the original data collector may then make a determination as to whether the identified customer may remain a recipient of subsequent data.

Turning now to FIG. 1, a process flow for the collection and processing of data sets consistent with certain embodiments of the present invention is shown. At 102, the process commences. At 104, an original data collector collects a Data Set, "x" that is comprised of raw, uncleaned data. At 106, the raw, uncleaned data is enhanced through removal of incorrect, incomplete, or corrupt data elements. At 108, a TracerID Tag is generated for a particular Enhanced Data Set and is Associated in a database with the Enhanced Data Set. At 110 a User-specific Custom Tag is Associated with the TracerID and the associated Custom Tag and TracerID are distributed to Users along with Tagged Data at 112. At 114 the original data collector collects a Data Set, "y" that may or may not be intermixed with data containing TracerID Tags and Custom Tags distributed with Tagged Data Feeds at 112. At 116 Data Set "y" is processed to determine whether it contains any such Tags. In an embodiment, the presence of such Tags would suggest that the data bearing such Tags was recycled from previously released Data Feeds. If Tags are determined to be present, then at 120 a database of Tag Associations is consulted to determine to which specific User the recycled data was originally distributed. At 122 the process ends. If no Tags are determined to be present, at 124 the Data Set "y" may be dealt with as the original data collector wishes. By way of non-limiting example, choices for the collector include Enhancing, or Discarding the Data Set "y", or Integrating the data in Data Set "y" with other fresh data to create a new Data Set. At 126 the process ends.

Figure 2:
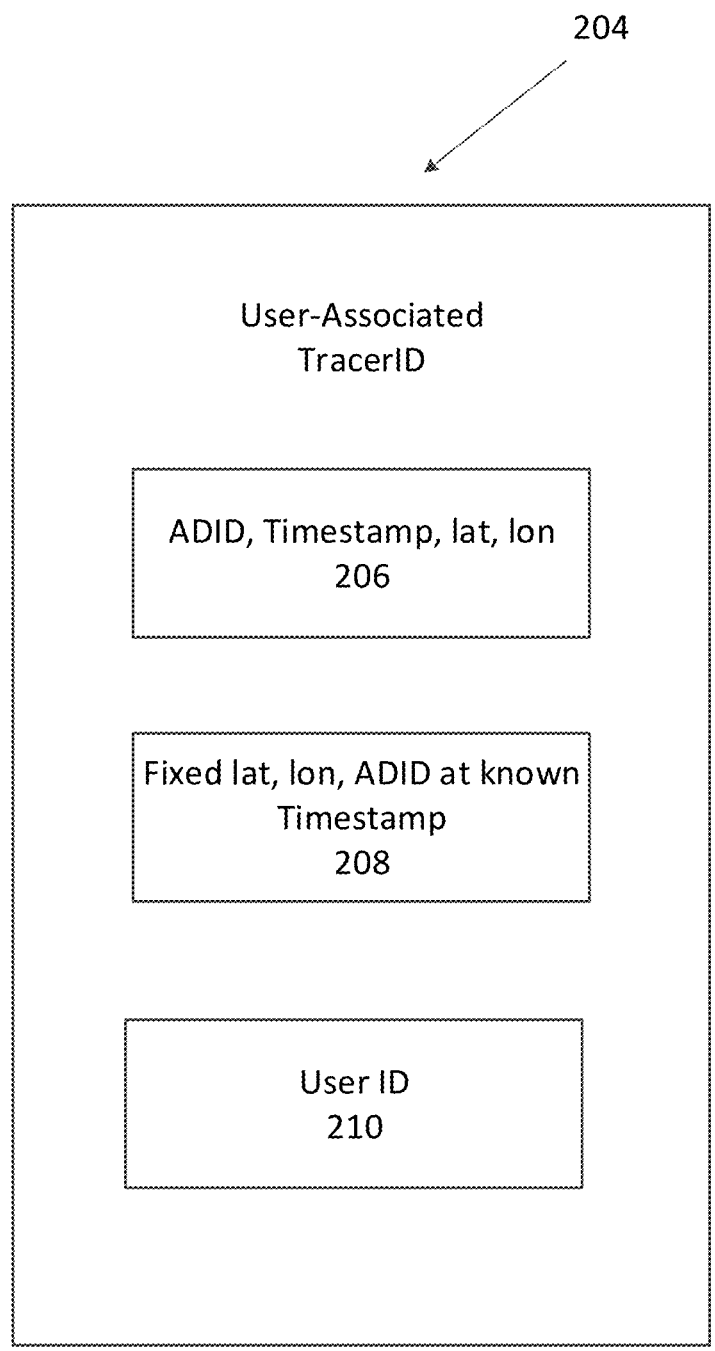
FIG. 2 is a representative view of the constituent part of a data feed identifier consistent with certain embodiments of the present invention.

Turning now to FIG. 2, a representative view of the constituent part of a data feed identifier consistent with certain embodiments of the present invention is shown. In an embodiment, the User-Associated TracerID of 204 is composed in part of an identifier (ADID), a Timestamp, and Global Positioning System location data (eg: "lat, lon") generated by the original data collector at 206. The User-Associated TracerID is further composed by the addition of a secondary Fixed location and identifier at a known Timestamp at 208. At 210 a custom User ID is appended to the Enhanced Data Set TracerID to form the User-Associated TracerID.

While certain illustrative embodiments have been described, it is evident that many alternatives, modifications, permutations and variations will become apparent to those skilled in the art in light of the foregoing description.

What is claimed is:

1. A method of tagging and recognizing recycled data comprising:
compiling a first data set;
generating a unique data identifier and tagging said first data set with the unique data identifier;
regenerating unique buyer-specific identifiers;
storing the unique buyer-specific identifiers and each identifier's association with a specific buyer user;
integrating the buyer-specific identifier into said unique data identifier;
distributing the first data set and the unique data identifier to one or more buyers;
receiving data sets other than said first data set;
evaluating such other data sets for attributes of said unique data identifier and/or one or more of said buyer-specific identifiers; and identifying to which buyer the first data set was sent prior to making a determination to stop the distribution of subsequent data to said identified buyer and providing said identity to the original data collector.

2. The method of claim 1, where the data identifier is associated with a distributable data set.

3. The method of claim 1, where the buyer-specific identifiers are customized to specific recipients of data feeds.

4. The method of claim 1, where the distributing of the first data set and the unique data identifier creates a customer-specific association between the buyer and the buyer's specific data feed.

5. The method of claim 1, where evaluating the other data sets for attributes further includes detecting the presence of recognized identifiers in the other data sets.

6. The method of claim 1, where the identifier is customized by sharing data elements similar to those contained within enhanced data.

7. The method of claim 1, where storing of identifiers, attributes, and associations is performed via a computer database.

* * * * *